United States Patent [19]
Ellis

[11] Patent Number: 5,513,741
[45] Date of Patent: May 7, 1996

[54] PROPORTIONAL SPACING MECHANISM WITH ASSISTED DRIVE

[75] Inventor: Malcolm P. Ellis, Ashland, Me.

[73] Assignee: Ellis Farms, Inc., Ashland, Me.

[21] Appl. No.: 284,361

[22] Filed: Aug. 2, 1994

[51] Int. Cl.⁶ ..................................................... B65G 13/12
[52] U.S. Cl. ..................... 198/782; 193/35 TE; 209/668; 74/89.15; 74/424.8 R
[58] Field of Search ........................ 198/282; 193/35 TE; 209/668, 676; 74/89.15, 424.8 R

[56] References Cited

U.S. PATENT DOCUMENTS

| | | | |
|---|---|---|---|
| 4,372,219 | 2/1983 | Gibbs | 198/782 |
| 4,405,050 | 9/1983 | Fenton et al. | 209/668 |
| 4,979,624 | 12/1990 | Ellis | 209/668 |
| 5,012,688 | 5/1991 | Ellis . | |
| 5,425,459 | 6/1995 | Ellis et al. | 209/668 |

Primary Examiner—Joseph E. Valenza
Attorney, Agent, or Firm—Daniel H. Kane, Jr.

[57] ABSTRACT

A proportional spacing mechanism proportionally spaces objects from a reference position on a fixed support frame. At least one supplemental drive mechanism assists the proportional spacing mechanism in moving the coupling elements and respective objects relative to each other for proportional spacing from the reference position. The supplemental drive mechanism incorporates a first portion coupled to a coupling element spaced from the reference position. A second portion of the supplemental drive mechanism is coupled to the fixed support frame. The supplemental drive mechanism extends and retracts the distance between the first and second portions for assisting motion of the coupling elements and respective objects during rotation of the shaft and crank of the proportional spacing mechanism. Various supplemental drive mechanisms are described including a chain and sprocket drive, a cylinder and piston drive, and a screw drive mechanism. The invention is applied in a roller conveyor apparatus to assist the proportional spacing of the rollers or spools which form the roller conveyor surface of the roller conveyor bed. The roller conveyor apparatus is used for example in a produce sizer or sorting machine.

20 Claims, 5 Drawing Sheets

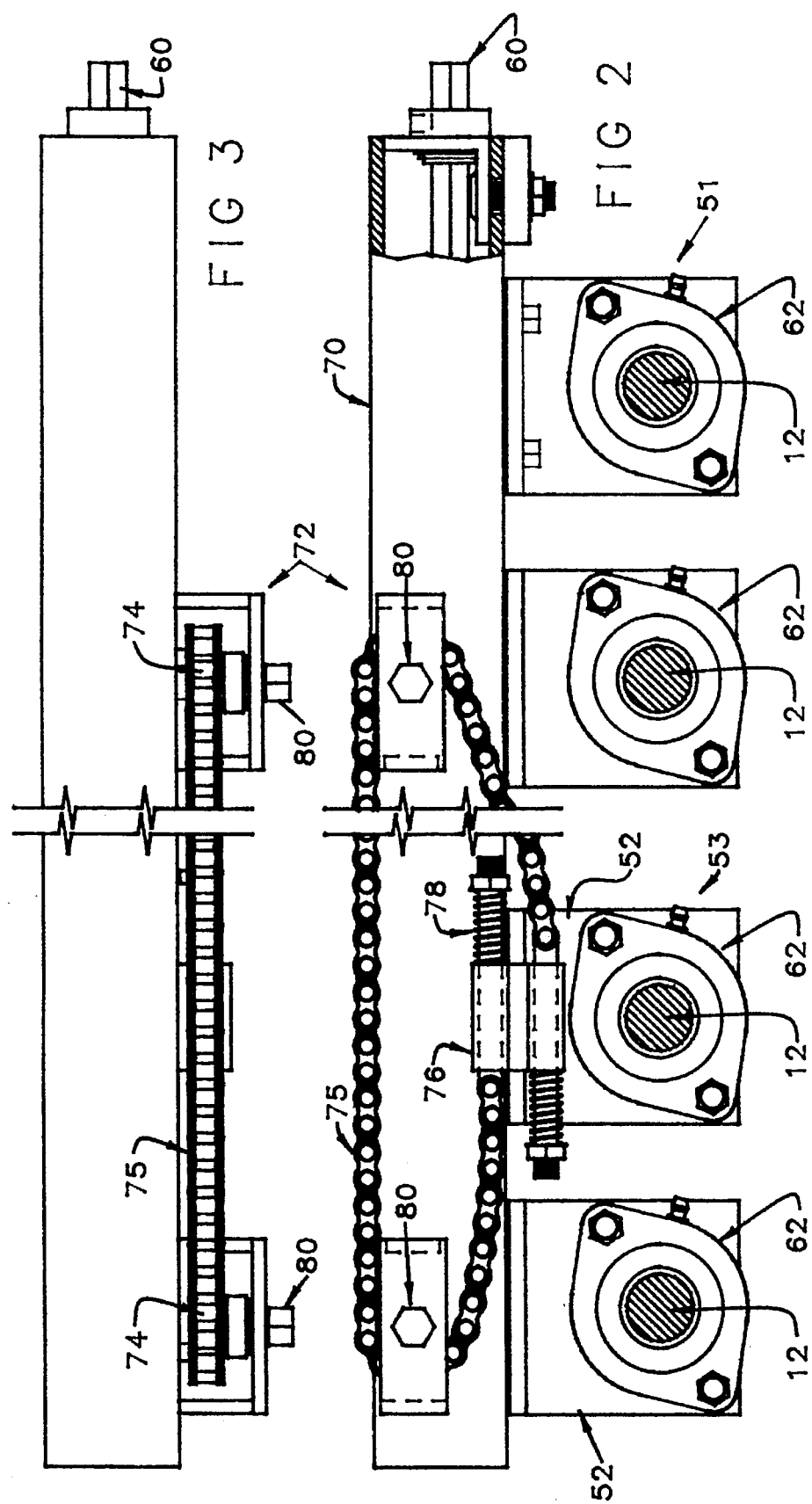

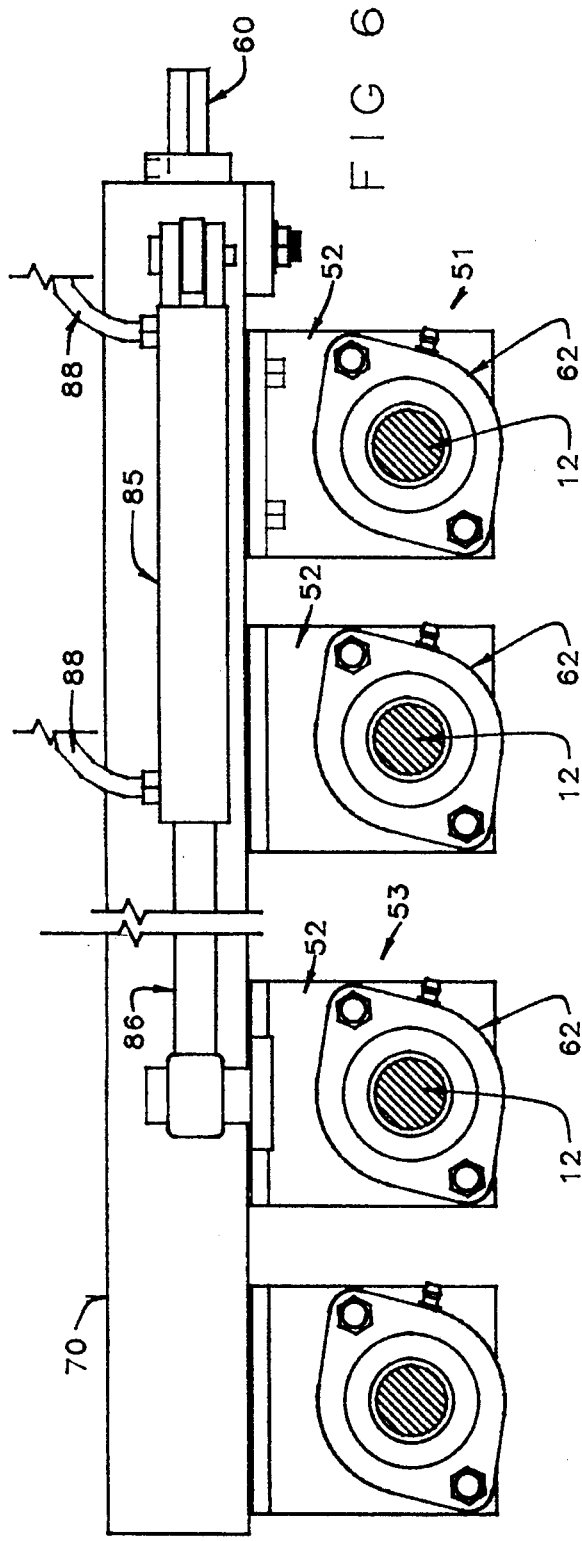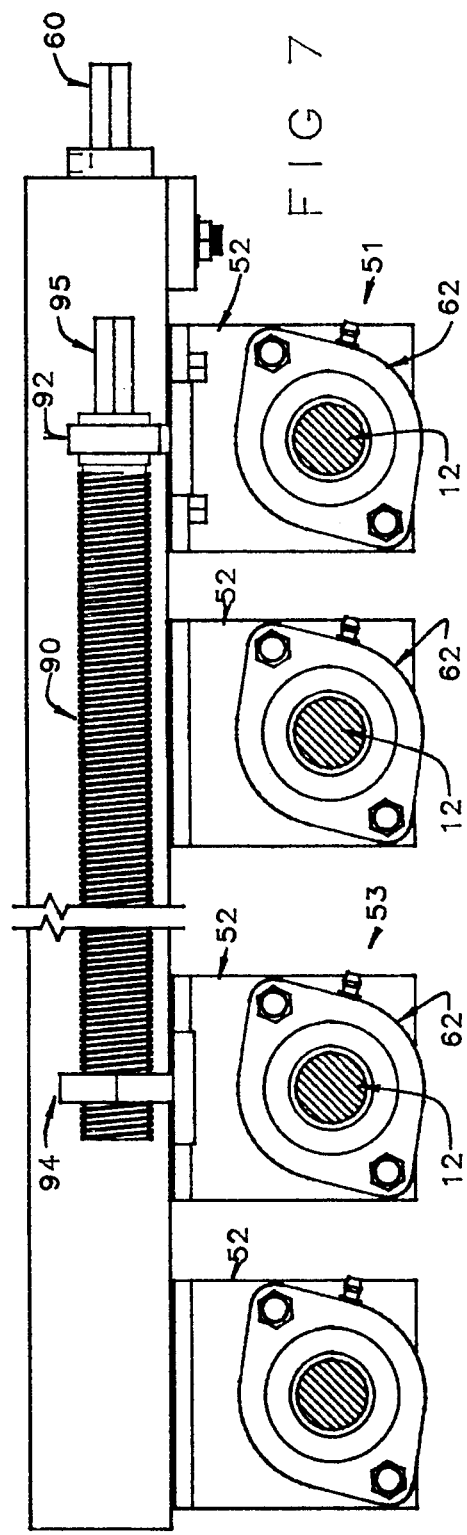

PROPORTIONAL SPACING MECHANISM WITH ASSISTED DRIVE

TECHNICAL FIELD

This invention relates to a new proportional spacing mechanism with a supplemental drive assembly to assist in the movement and proportional spacing of large or heavy objects. The invention is particularly applicable for proportionally spacing the rollers or spools of a roller conveyor apparatus typically used for transporting and sizing produce and other objects. The present invention facilitates movement and proportional spacing of a set of heavy rollers without seizing or high torque twisting of the proportional spacing mechanism drive shaft.

BACKGROUND ART

The Malcolm P. Ellis U.S. Pat. No. 5,012,688 issued May 7, 1991 describes a proportional spacing mechanism assembled from a plurality of coupling elements. The coupling elements are coupled respectively to roller mounts at the ends of the conveyor rollers of a roller conveyor bed. More generally, the coupling elements, e.g. blocks or slide carriages, are secured to any collection of objects to be variably or proportionally spaced.

Each coupling element is formed with an internally threaded receiver on one side of the coupling element in fixed relationship to the coupling element. An elongate externally threaded bolt extends from the other side of the coupling element and is supported for rotation relative to the coupling element. The coupling elements are coupled together with the externally threaded bolt of one engaging the internally threaded receiver of the next adjacent coupling element. The assembled coupling elements effectively form a multielement axle for example along one or both sides of the roller conveyor bed.

The bolts are formed with an internal channel with a length of noncircular cross section so that a rod or shaft of complementary noncircular cross section may extend through the bolts and engage the bolts. Rotation of the rod for example by a crank rotates the bolts relative to the receivers fixed to the coupling elements for extending and retracting the rollers or spools. The rollers of the roller conveyor bed are suspended from the roller mounts on the coupling elements. The rollers are thereby equally spaced from each other and proportionally spaced from a reference position. Equal spacing and proportional spacing from a reference position is maintained during movement of all of the rollers.

Larger roller conveyor beds and sizing and sorting devices may be constructed with rolls up to six feet in length coated with an outer rubber layer and weighing for example as much as two hundred pounds. The roller bed conveyor may include as many as for example twenty rolls. The total load of the conveyor bed rollers that must be moved laterally by the proportional spacing mechanism may reach as much as one to two tons.

In U.S. Pat. No. 5,012,688 the proportional spacing mechanism shaft is driven by a manual or motor driven crank at one end of the shaft. The crank and shaft must move the load of all the rollers simultaneously. A problem is encountered with the heavier roller conveyor beds. The crank shaft may twist under the applied torque causing seizing of the load of rollers and obstruction of the movement of the rollers.

A similar problem is encountered with proportional spacing mechanisms of the type using right and left hand threaded bolt spacers for spacing the coupling elements. In this type of proportional spacing device the coupling elements are formed with a threaded receiver on each side of the coupling element. One threaded receiver has a right handed internal thread while the other threaded receiver has a left handed internal thread. The receivers are fixed relative to the coupling elements. Threaded bolts or spacers formed one half with right handed thread and one half with left handed thread join the coupling elements at the threaded receivers. The assembled coupling elements again form the multielement axle along one or both sides of the roller conveyor bed.

The right and left hand threaded bolts are also formed with an internal channel with non-circular cross section. A rod of complementary noncircular cross section extends through the bolts and engages and turns the bolts. Rotation of the rod by e.g. a crank rotates the bolts relative to the coupling element receivers, spacing the coupling elements at twice the rate of the proportional spacing mechanism of U.S. Pat. No. 5,012,688 because of the simultaneous right and left hand threads. This places even greater torque on the rod when the coupling elements support heavy rollers in heavy duty roller conveyor beds.

OBJECTS OF THE INVENTION

It is therefore an object of the present invention to provide a proportional spacing mechanism capable of moving and proportionally spacing a heavy load of rollers or other objects without twisting of the drive shaft and seizing of the rollers. The invention is particularly applicable for the larger roller conveyor beds of large scale sizing and sorting machines.

Another object of the invention is to provide an additional or supplemental drive mechanism to assist in the movement of conveyor bed rollers and spools in cooperation with and in coordination with the crank drive mechanism and shaft of the proportional spacing mechanism.

A further object of the invention is to provide a variety of assisting drive mechanisms which can be selected according to the application applicable to the major types of proportional spacing mechanisms.

DISCLOSURE OF THE INVENTION

In order to accomplish these results the present invention provides an improved proportional spacing mechanism of the type described for example in U.S. Pat. No. 5,012,688 for proportionally spacing objects from a reference position on a fixed support frame. The invention is of course also applicable to proportional spacing mechanisms of the type using right and left hand threaded bolt spacers. According to the invention at least one supplemental drive mechanism is provided to assist the proportional spacing mechanism in moving the coupling elements and respective objects relative to each other for proportional spacing from the reference point. The supplemental drive mechanism generally includes a first portion coupled to a coupling element spaced from the reference position and a second portion coupled to the fixed support frame. The supplemental drive mechanism extends and retracts the distance between the first and second portions for assisting motion of the coupling elements and respective objects during rotation of the shaft of the proportional spacing mechanism.

The fixed support frame of the proportional spacing mechanism for example as described in U.S. Pat. No. 5,012,688 is typically an elongate framework constructed for slidably bearing the weight of the objects and respective coupling elements. Such an elongate framework may be in the configuration of an elongate track from which the coupling elements and respective objects are suspended. An elongate framework is also an integral part of the proportional spacing mechanism using right and left hand threaded bolt spacers.

According to a preferred example embodiment of the invention, the supplemental drive mechanism is a chain drive having rotating sprockets mounted on the elongate framework or track of the fixed support frame on either side of a specified coupling element. A drive chain is mounted over the sprockets and is secured to a location on the selected coupling element.

The chain drive is constructed with a rotary drive for turning at least one sprocket. The chain drive thereby assists motion of the coupling elements and respective objects during rotation of the shaft of the proportional spacing mechanism. The chain drive may be spring loaded for example at the location on the coupling element where the drive chain is secured to the coupling element for retaining the chain on the sprockets.

A feature of the supplemental drive mechanism of the present invention is that it is only necessary to couple the supplemental drive mechanism to one of the coupling elements spaced from the reference position. The assist in moving the one selected coupling element provides assistance in moving all of the coupling elements coupled together in the multielement spacer. Because of the linkage of all of the coupling elements in the multielement spacer the assist to one coupling element provides an assist to all of the coupling elements and respective objects for proportional spacing from the reference position.

According to an alternative embodiment the supplemental drive mechanism is a cylinder and piston. One of the cylinder and piston is coupled to the fixed support frame and the other of the cylinder and piston is coupled to a selected coupling element spaced from the reference position. A control extends and retracts the piston in the cylinder for assisting motion of the coupling elements and respective objects during rotation of the shaft of the proportional spacing mechanism. In another preferred example the piston and cylinder are an hydraulic piston and cylinder with an hydraulic control.

According to another alternative embodiment the supplemental drive mechanism is a screw drive mechanism. A threaded bolt is mounted for rotation on the fixed support frame while a complementary engaging nut is mounted in stationary position on the selected coupling element. The nut engages the bolt and a rotary drive rotates the bolt to assist motion of the coupling elements and respective objects during rotation of the shaft of the proportional spacing mechanism.

Where the fixed support frame is a roller conveyor bed, the objects for proportional spacing from the reference position are rollers which form the conveyor surface of the roller conveyor bed. The proportional spacing mechanism permits expansion and contraction of the rollers in an equal or proportional spacing relationship. Two sets of coupling elements can be provided, one set mounted on each end of the ends of the respective rollers.

According to a further embodiment of the invention first and second supplemental drive mechanisms are provided mounted on each side of the roller conveyor bed. Each supplemental drive assists moving the coupling elements and respective rollers on each side of the roller conveyor bed.

Other objects features and advantages of the invention are apparent in the following specification and accompanying drawings.

BRIEF DESCRIPTION OF THE DRAWINGS

FIG. 2 is a diagrammatic side view of a proportional spacing mechanism according to the invention showing a supplemental drive mechanism chain drive mounted on the proportional spacing mechanism.

FIG. 3 is a plan view of the proportional spacing mechanism of FIG. 2 while

FIG. 6 is a fragmentary diagrammatic side view of another proportional spacing mechanism with a supplemental drive mechanism piston and cylinder mounted on the proportional spacing mechanism.

FIG. 7 is a side view of another proportional spacing mechanism with a supplemental drive mechanism screw drive mounted on the proportional spacing mechanism.

DESCRIPTION OF PREFERRED EXAMPLE EMBODIMENTS AND BEST MODE OF THE INVENTION

Figure 1:
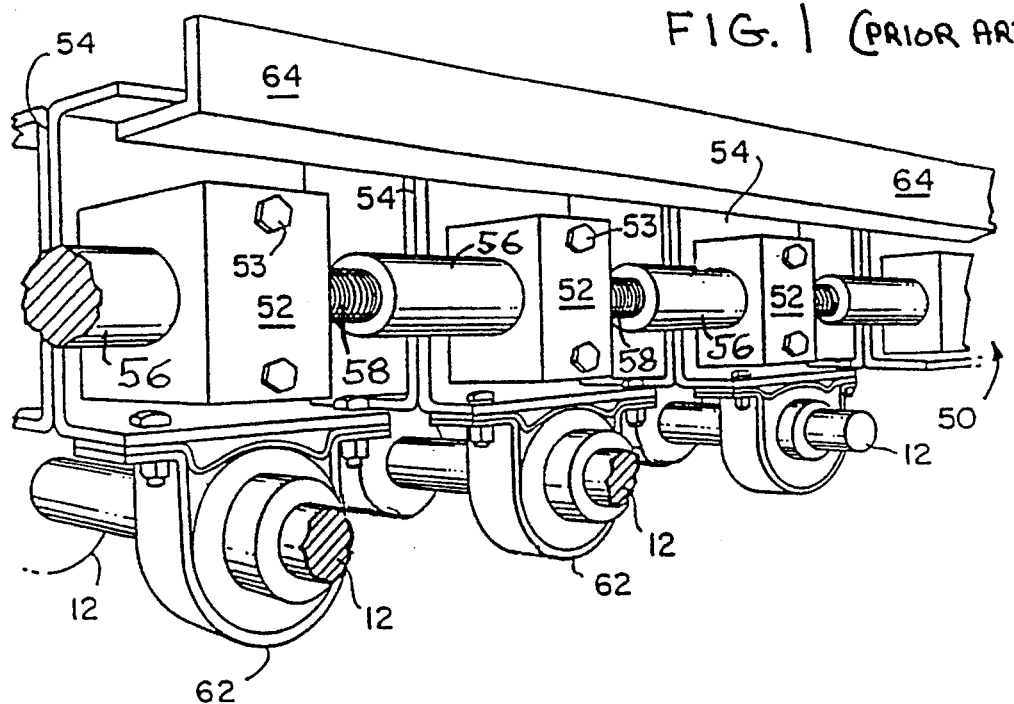
FIG. 1 is a side perspective view of the elongate framework of the roller conveyor bed and proportional spacing mechanism as disclosed in U.S. Pat. No. 5,012,688 showing the coupling elements of the proportional spacing mechanism suspended from a track and the respective rollers suspended in roller mounts from the coupling elements.

A proportional spacing mechanism for adjustably and proportionately equally spacing rollers from each other is illustrated in FIG. 1. The proportional spacing mechanism includes a multielement axle 50 along each side of the roller conveyor bed. The multielement axle 50 is formed by a plurality of coupling elements 52 which are secured to roll supports or support hangers 54 by for example bolts 53 as illustrated in FIG. 1.

Each coupling block or coupling element 52 is provided with an internally threaded receiver 56, in this example a sleeve, extending from one side of the coupling block 52 in fixed relationship to the coupling block or yoke 52 and corresponding conveyor roller 12. Extending from the other side of each coupling block 52 in the opposite direction from the internally threaded sleeve 56 is an externally threaded bolt 58 rotationally held by the coupling element 52. The coupling elements are secured together to form the multielement shaft or axle with the externally threaded bolt 58 extending from one coupling block or yoke 52 engaging the internally threaded receiver 56 of another adjacent coupling block 52.

Each of the bolts 58 of the respective sequential coupling elements 52 is formed with an internal channel including a length of 58a of noncircular section, for example square, rectangular, or hexagonal cross section. A rod or shaft 60 of complementary noncircular cross section such as square, rectangular or hexagonal cross section extends through the bolts 58 of the multielement shaft 50 for rotating the bolts 58 relative to the receivers or sleeves 56 thereby spacing the coupling blocks 52 and therefore the respective rollers 12 equally and proportionally from a reference position. One of the rollers 12, roller support hangers 54 and coupling blocks 52 secured to the roll conveyor bed housing provides the reference position with respect to which all of the other coupling blocks 52 move proportionately upon rotation of the rod 60.

Figure 1A:
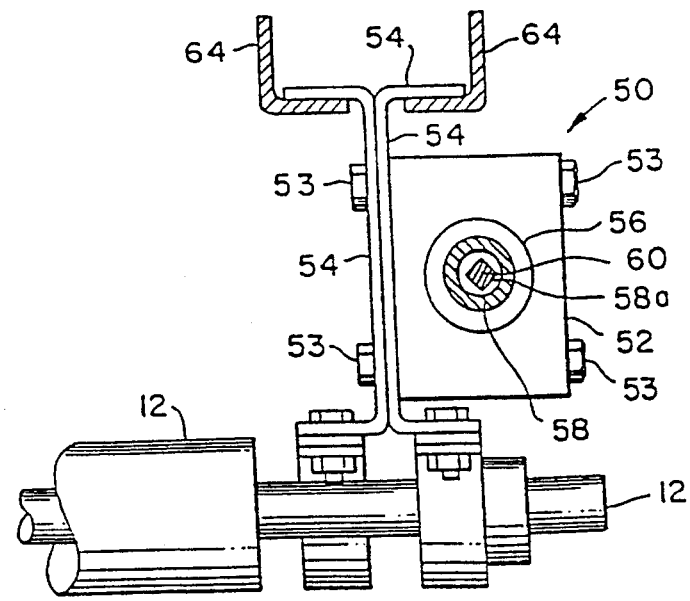
FIG. 1A is a partial end cross section through the sliding track as disclosed in U.S. Pat. No. 5,012,688 showing a suspended coupling element, roller mount and roller.

In the example of FIGS. 1 and 1A the rollers 12 are secured to roller supports, or support hangers 54 by pillow block type bearings 62. The roller support hangers 54 are in turn suspended from a track 64 which bears the weight of the rollers. A feature and advantage of this arrangement is that the multielement shaft 50 cannot and does not support or bear the weight of the conveyor rollers 12. Rather the coupling blocks or coupling elements 52 are secured to the roller support hangers 54 and perform the function of equal or proportionate spacing only without bearing the weight of the objects to be variably spaced.

An advantage of the multielement shaft constructions illustrated in FIG. 1 is that the coupling element externally threaded bolts 58 and internally threaded receivers 56 are formed with threads all turning in the same direction. All of the threads are formed with the same thread gauge or size. The elements are therefore interchangeable. Furthermore all of the bolts 58 turn in the same direction relative to the internally threaded sleeves 56 for turning simultaneously with the shaft 60 producing equal and proportionate spacing from a reference coupling block or reference station on the conveyor bed housing.

A proportional spacing mechanism with assisted drive according to the invention is illustrated in FIGS. 2–5. In this embodiment the multielement axle formed by the coupling element threaded receivers and threaded bolts is housed within an elongate framework 70 which forms part of the fixed support frame of a roller conveyor bed or other set of objects for proportional spacing. The elongate framework 70 also forms a sliding track for the depending portions of the coupling elements 52 which in turn support roller bearings in which the conveyor rollers 12 are mounted.

Figure 4:
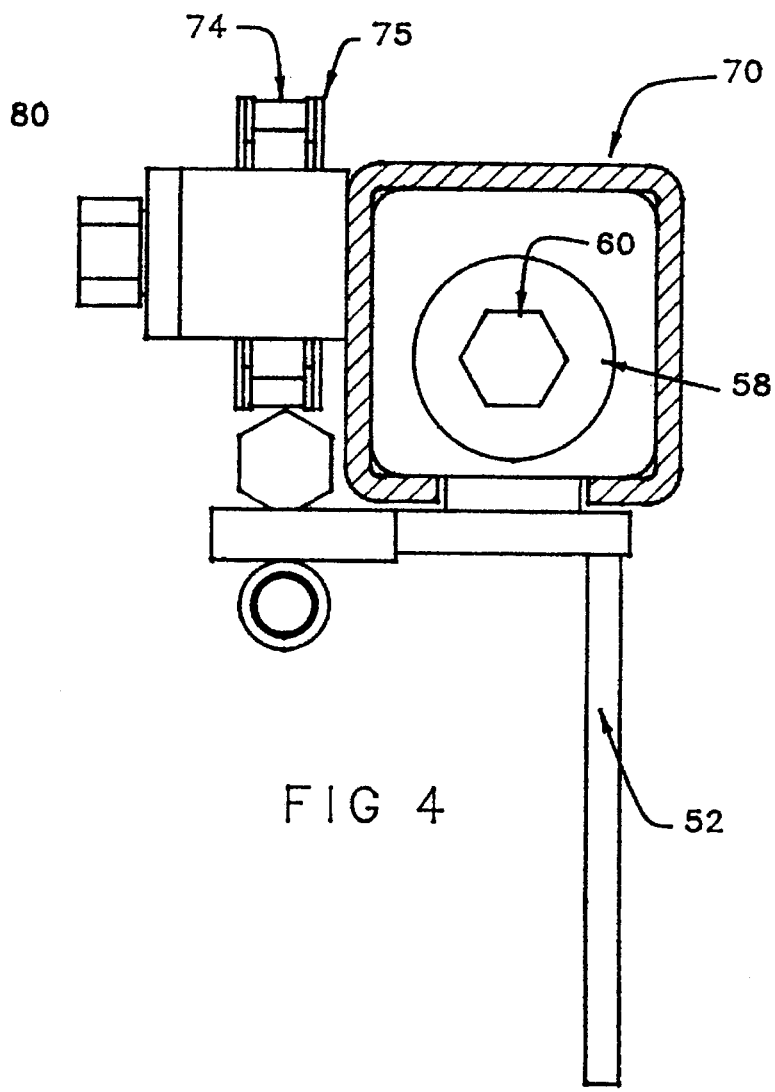
FIG. 4 is an end view of the proportional spacing mechanism of FIG. 2.

The noncircular shaft 60, in this case of hexagonal cross section is visible in FIGS. 2,3 and 4. The drive shaft 60 is a rotary shaft which can be manually driven by a crank or motor driven for turning the threaded bolts of the respective coupling elements 52 in the threaded receivers or sleeves of the adjacent coupling elements 52. In this case the first coupling element designated by arrow 51 is stationary and provides the reference position. Rotation of the shaft 60 causes simultaneous movement of all of the other coupling elements 52 and supported rollers 12 maintaining equal spacing between the rollers while the rollers move proportionally greater distances from the stationary coupling element 51 according to their relative positions.

In the case of a large number of heavy rollers 12, movement of the load by rotation of shaft 60 is assisted by the supplemental drive mechanism 72 in the form of a chain drive. As shown in FIGS. 2–4, the chain drive 72 is composed of a pair of sprockets 74 mounted for rotation on the elongate framework 70 spaced on either side of a selected coupling element indicated by arrow 53. A chain 75 is mounted over the sprockets 74. The ends of chain 75 are then secured to a block 76 at a location on the selected coupling element 53 to form a closed loop drive chain.

As shown in FIG. 2, the length of the drive chain 75 can be set by anchor bolts 78 threadedly mounted in the block 76. The ends of chain 75 are coupled to the threaded bolts 78 for setting the length of the chain. Furthermore it is advantageous to secure the ends of the drive chain 75 to the ends of the anchor bolts 78 by springs inside the anchor block 76 and not visible in FIG. 2. The spring constant of the springs is selected to afford a desired spring tension on the drive chain 75 for holding the drive chain onto the sprockets 74.

Figure 5:
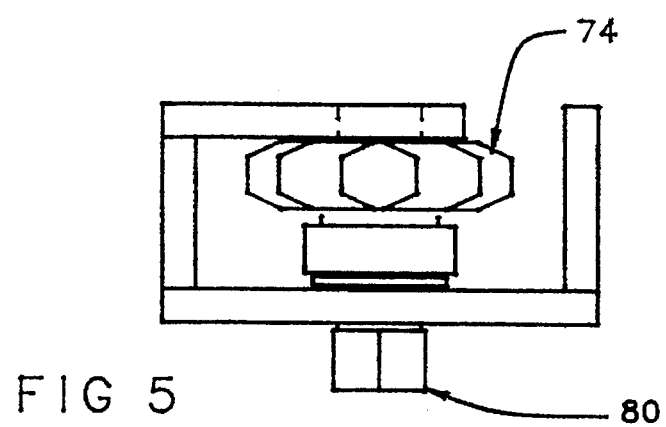
FIG. 5 is a plan view of a sprocket of the chain drive with the chain removed and showing the rotary drive element for rotating the sprocket.

To assist translation of the coupling elements 52 and supported rollers 12 during rotation of rotary shaft 60 of the proportional spacing mechanism, at least one drive element 80 is provided for turning one of the sprockets 74 in the appropriate direction to assist with expansion and contraction of the rollers. In this case the drive element 80 is a hexagonal nut which can be manually turned by a wrench or crank or motor driven. The sprocket 74 and drive nut 80 are illustrated in FIG. 5 with the chain removed.

For operation of the supplemental drive mechanism chain drive 72, the rotary drive element 80 can be rotated in either direction for turning the sprockets 74. According to the direction of rotation the chain drive 72 facilitates either expansion or contraction of the set of rollers 12 suspended by the coupling elements 52 during rotation of the drive shaft 60. Coupling of the chain drive 72 to only one selected coupling element 53 is sufficient to assist simultaneous translation of all of the coupling elements and respective rollers without undue torque on the rotary drive shafts 60. Any torque twisting of the drive shaft 60 and seizing of the coupling elements is thereby avoided.

A second embodiment of the proportional spacing mechanism is illustrated in FIG. 6. In this example the supplemental drive mechanism is an hydraulic cylinder 85 and piston 86. The hydraulic cylinder 85 is secured to the elongate framework 70 while the piston 86 is connected to the selected coupling element 53. Hydraulic controls through hydraulic lines 88 can cause extension and retraction of the piston 86 within cylinder 85 to assist in expansion and contraction of the rollers 12 in roller mounts 62 suspended by the coupling elements 52. Once again it is noted that the moving piston 86 is coupled to only one of the coupling elements 53 for the purpose of assisting translation of all of the coupling elements 52 during rotation of the drive shaft 60.

A third example embodiment of the proportional spacing mechanism is illustrated in FIG. 7. As shown in FIG. 7 the supplemental drive mechanism is a screw drive mechanism consisting of a threaded bolt 90 mounted for rotation in a bearing 92 on the elongate framework 70. The threaded bolt 90 is mounted for threaded movement in a nut 94 which is secured in fixed position on the selected coupling element 53. A drive element 95 is provided at the end of the threaded bolt 90 for turning the bolt 90 for rotation in either direction. The supplemental screw drive mechanism can therefore be used to assist translation of the coupling elements and rollers during rotation of the drive shaft 60 for either expansion or contraction of the set of rollers of the roller conveyor bed.

It is noted that other drive mechanisms can be used for the supplemental drive mechanism for assisting the drive shaft 60 of the proportional spacing mechanism. In each case it is only necessary that the supplemental or assisted drive be coupled to one selected coupling element.

Figure 8:
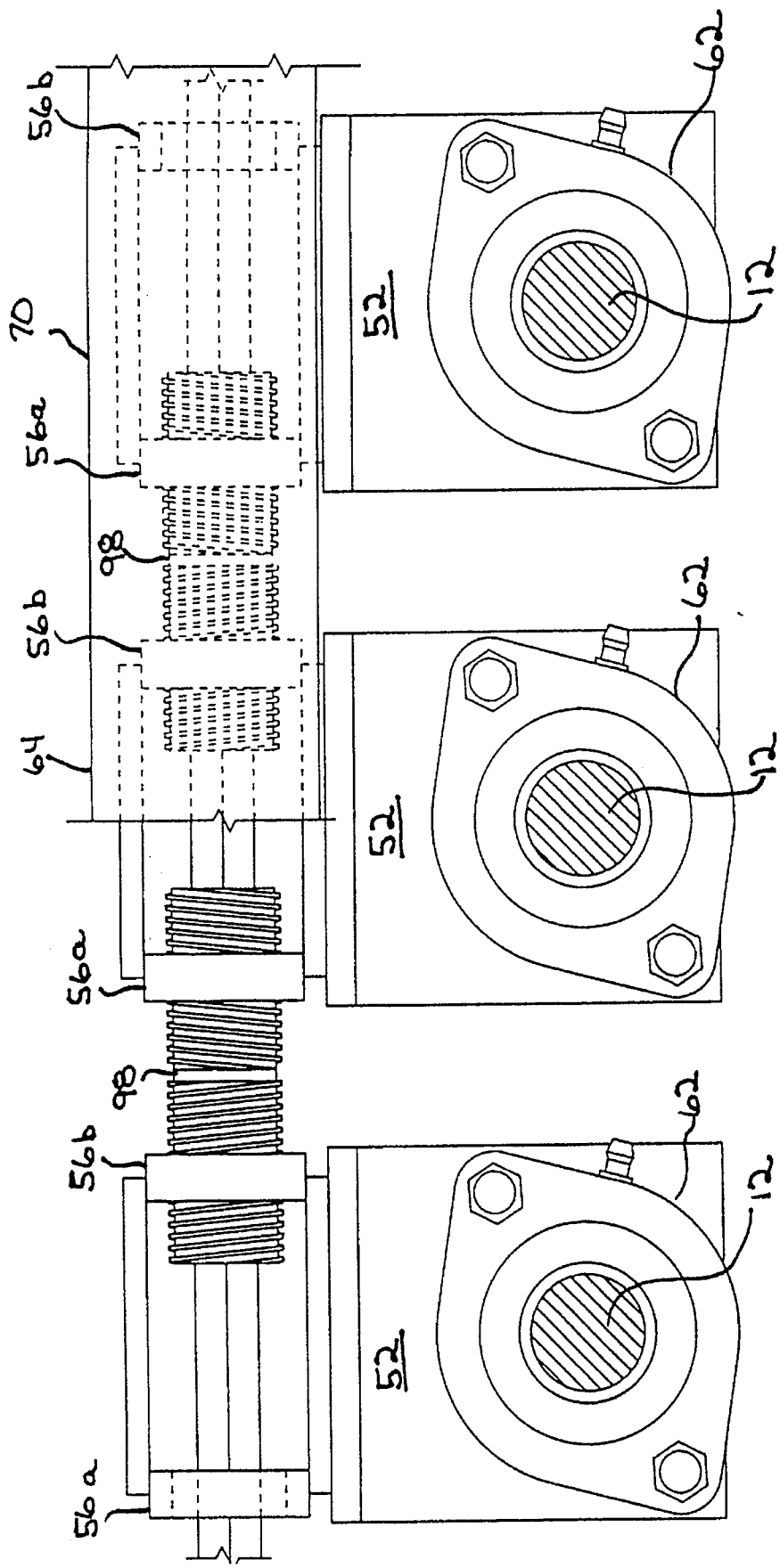
FIG. 8 is a side view of the related proportional spacing mechanism with right and left hand threaded bolt spacers on which a supplemental drive mechanism according to the invention can be mounted.

A related proportional spacing mechanism with right and left hand threaded bolt spacers 98 is illustrated in FIG. 8. In this case, the coupling elements 52 are each formed with threaded receivers or nuts 56a,56b on opposite sides of the coupling elements 52. The threaded receivers 56a,56b are formed with opposite right and left hand internal threads. The right and left hand threaded bolts 98 join the coupling elements 52 at the receivers or nuts 56a,56b.

The assembled coupling elements form the multielement axle which is in turn suspended from track 64. Track 64 is part of the elongate framework 70 of the fixed support frame of e.g. a roller conveyor apparatus. Other elements of the roller conveyor apparatus of FIG. 8 corresponding to the elements of FIGS. 1–7 are indicated by the same reference numerals.

A supplemental drive mechanism 72, 85/86, 90/92 as illustrated in FIGS. 2,6 and 7 can be applied to the proportional spacing mechanism of FIG. 8 in a similar manner. For example the chain drive 72 can be mounted with the chain drive sprockets 74 and rotary drive elements 80 on the elongate frame 70. The ends of the chain 75 are similarly secured to a block 76 in turn fixed to a selected one of the coupling elements 52 to form the closed loop drive chain.

In the alternative embodiments, the hydraulic cylinder 85 can be mounted on the elongate framework 70 while the piston 86 is secured to a selected one of the coupling elements 52 to assist in expansion or contraction of the rollers or other objects. For the screw drive mechanism, the threaded bolt 90 can be mounted for rotation on a bearing 92 in turn mounted on the elongate framework 70. The threaded bolt is mounted for movement upon turning through the nut 94 secured in fixed position on a selected one of the coupling elements 52.

While the invention has been described with reference to particular example embodiments, it is intended to cover all variations and equivalents within the scope of the following claims.

I claim:

1. An improved proportional spacing mechanism for proportionally spacing objects from a reference position on a fixed support frame, said proportional spacing mechanism having a plurality of coupling elements coupled respectively to the objects, each coupling element comprising an internally threaded receiver on one side of the coupling element in fixed relationship to the coupling element, and an elongate externally threaded bolt extending from the coupling element on a side opposite the internally threaded receiver, said externally threaded bolt being coupled for rotation relative to the coupling element, said plurality of coupling elements being coupled together with the externally threaded bolt of one coupling element engaging the internally threaded receiver of another coupling element to form a multielement axle, said bolts being formed with a longitudinal internal channel of noncircular cross section, and a shaft of complementary noncircular cross section extending through the bolts for engaging and rotating the bolts relative to the receivers and for spacing the coupling elements and respective objects proportionally from said reference position on the fixed support frame, the improvement comprising:

at least one supplemental drive mechanism to assist the proportional spacing mechanism in moving the coupling elements and respective objects relative to each other for proportional spacing from the reference position, said supplemental drive mechanism comprising a first portion coupled to a coupling element spaced from said reference position and a second portion coupled to the fixed support frame, said supplemental drive mechanism extending and retracting the distance between said first and second portions for assisting motion of the coupling elements and respective objects during rotation of the shaft of said proportional spacing mechanism.

2. The improved proportional spacing mechanism of claim 1 wherein the fixed support frame comprises an elongate framework constructed for slidably bearing the weight of the objects and respective coupling elements.

3. The improved proportional spacing mechanism of claim 2 wherein the elongate framework constructed for slidably bearing the weight of the objects comprises an elongate track from which coupling elements and respective objects are suspended.

4. The improved proportional spacing mechanism of claim 2 wherein the supplemental drive mechanism comprises a chain drive.

5. The improved proportional spacing mechanism of claim 4 wherein said supplemental drive mechanism comprises a chain drive having rotating sprockets mounted on the elongate framework of the fixed support frame on either side of a specified coupling element, and a drive chain mounted over said sprockets, said chain being secured to a location on said selected coupling element.

6. The improved proportional spacing mechanism of claim 5 wherein the chain drive comprises drive means for turning at least one sprocket for assisting motion of the coupling elements and respective objects during rotation of the shaft of the proportional spacing mechanism.

7. The improved proportional spacing mechanism of claim 6 wherein the chain drive is spring loaded at the location where it is secured to the coupling element.

8. The improved proportional spacing mechanism of claim 1 wherein the supplemental drive mechanism comprises a cylinder and piston.

9. The improved proportional spacing mechanism of claim 8 wherein one of the cylinder and piston is coupled to the fixed support frame and the other of the cylinder and piston is coupled to a selected coupling element, and further comprising control means for extending and retracting the piston in said cylinder for assisting motion of the coupling elements and respective objects during rotation of the shaft of the proportional spacing mechanism.

10. The improved proportional spacing mechanism of claim 9 wherein the control means comprises hydraulic control means.

11. The improved proportional spacing mechanism of claim 1 wherein the supplemental drive mechanism comprises a screw drive mechanism.

12. The improved proportional spacing mechanism of claim 11 wherein the screw drive mechanism comprises a threaded bolt mounted for rotation on the fixed support frame, a complementary engaging nut mounted on a selected coupling element engaging said bolt, and a rotary drive means for rotating the bolt to assist motion of the coupling elements and respective objects during rotation of the shaft of the proportional spacing mechanism.

13. The improved proportional spacing mechanism of claim 1 wherein the fixed support frame is a roller conveyor bed and the objects for proportional spacing from a reference position are rollers forming a conveyor surface of the roller conveyor bed, and further comprising two sets of coupling elements, one set mounted on each end of the respective rollers.

14. The improved proportional spacing mechanism of claim 13 comprising first and second supplemental drive mechanisms, one mounted on each side of the roller conveyor bed to assist moving the coupling elements and respective rollers on each side of the roller conveyor bed.

15. An improved proportional spacing mechanism for proportionally spacing rollers from a reference position on a fixed support frame of a roller conveyor bed, said proportional spacing mechanism having a plurality of coupling elements coupled respectively to the rollers, each coupling element comprising at least one internally threaded receiver secured to the coupling element in fixed relationship to the coupling element, a plurality of elongate externally threaded bolt spacers extending the coupling elements and threaded receivers, said externally threaded bolt spacers being mounted for rotation relative to the coupling elements, said plurality of coupling elements being coupled together by the threaded bolt spacers to form a multielement axle, said bolt spacers being formed with a longitudinal internal channel of noncircular cross section, and a shaft of complementary noncircular cross section extending through the bolt spacers for engaging and rotating the bolt spacers relative to the receivers, for spacing the coupling elements and respective rollers proportionally from said reference position on the fixed support frame, the improvement comprising:

at least one supplemental drive mechanism to assist the proportional spacing mechanism in moving the coupling elements and respective rollers relative to each other for proportional spacing from the reference position, said supplemental drive mechanism comprising a first portion coupled to a coupling element spaced from said reference position and a second portion coupled to the fixed support frame, said drive mechanism comprising a drive element for extending and retracting the distance between said first and second portions for assisting motion of the coupling elements and respective rollers during rotation of the shaft of said proportional spacing mechanism.

16. The improved proportional spacing mechanism of claim 15 wherein the fixed support frame comprises an elongate framework constructed for slidably bearing the weight of the rollers and respective coupling elements.

17. The improved proportional spacing mechanism of claim 16 wherein the supplemental drive mechanism comprises a chain drive having sprockets mounted on the elongate framework of the fixed support frame on either side of a specified coupling element, and a drive chain mounted over said sprockets, said drive chain being secured to a location on said selected coupling element, said chain drive comprising drive means for turning at least one sprocket for assisting motion of the coupling elements and respective rollers during rotation of the shaft of the proportional spacing mechanism.

18. The improved proportional spacing mechanism of claim 15 wherein the supplemental drive mechanism comprises a cylinder and piston, wherein one of the cylinder and piston is coupled to the fixed support frame and the other of the cylinder and piston is coupled to a selected coupling element, and further comprising hydraulic control means for extending and retracting the piston in said cylinder for assisting motion of the coupling elements and respective rollers during rotation of the shaft of the proportional spacing mechanism.

19. The improved proportional spacing mechanism of claim 15 comprising two sets of coupling elements, one set mounted on each end of the respective rollers.

20. An improved proportional spacing mechanism for proportionally spacing objects from a reference position on a fixed support frame, said proportional spacing mechanism having a plurality of coupling elements coupled respectively to the objects, each coupling element comprising at least one internally threaded receiver secured in fixed relationship to the coupling element, and a plurality of elongate externally threaded bolts extending between the coupling elements and internally threaded receivers, said externally threaded bolts being mounted for rotation relative to the coupling elements, said plurality of coupling elements being coupled together by the externally threaded bolts to form a multielement axle, said bolts being formed with a longitudinal internal channel of noncircular cross section, and a shaft of complementary noncircular cross section extending through the bolts for engaging and rotating the bolts relative to the receivers and for spacing the coupling elements and respective objects proportionally from said reference position on the fixed support frame, the improvement comprising:

at least one supplemental drive mechanism to assist the proportional spacing mechanism in moving the coupling elements and respective objects relative to each other for proportional spacing from the reference position, said supplemental drive mechanism comprising a first portion coupled to a coupling element spaced from said reference position and a second portion coupled to the fixed support frame, said supplemental drive mechanism extending and retracting the distance between said first and second portions for assisting motion of the coupling elements and respective objects during rotation of the shaft of said proportional spacing mechanism.

\* \* \* \* \*